US008515231B2

(12) United States Patent
Borel et al.

(10) Patent No.: US 8,515,231 B2
(45) Date of Patent: Aug. 20, 2013

(54) METHOD OF MAKING AN OPTICAL FIBER WITH TRENCH REGION IN ITS INDEX PROFILE

(75) Inventors: Peter Ingo Borel, Frederiksberg (DK); David John DiGiovanni, Mountain Lakes, NJ (US); John Michael Fini, Metuchen, NJ (US); Poul Kristensen, Valby (DK)

(73) Assignee: OFS Fitel, LLC, Norcross, GA (US)

( * ) Notice: Subject to any disclaimer, the term of this patent is extended or adjusted under 35 U.S.C. 154(b) by 0 days.

(21) Appl. No.: 13/605,038

(22) Filed: Sep. 6, 2012

(65) Prior Publication Data

US 2013/0091899 A1 Apr. 18, 2013

Related U.S. Application Data

(60) Division of application No. 13/374,205, filed on Dec. 15, 2011, now Pat. No. 8,320,726, which is a division of application No. 12/472,522, filed on May 27, 2009, now Pat. No. 8,107,784, which is a continuation-in-part of application No. 12/072,869, filed on Feb. 28, 2008, now Pat. No. 8,374,472, which is a continuation-in-part of application No. 11/818,780, filed on Jun. 15, 2007, now abandoned.

(60) Provisional application No. 61/056,461, filed on May 28, 2008.

(51) Int. Cl.
*G02B 6/02* (2006.01)

(52) U.S. Cl.
USPC .............................. 385/127; 65/397; 65/427

(58) Field of Classification Search
USPC ........... 385/123–128; 65/385, 397, 414–417, 65/427, 430, 435, 439
See application file for complete search history.

(56) References Cited

U.S. PATENT DOCUMENTS

| 7,095,940 | B2* | 8/2006 | Hayami et al. | 385/137 |
|---|---|---|---|---|
| 8,073,301 | B2* | 12/2011 | Gibson et al. | 385/127 |
| 2004/0112089 | A1* | 6/2004 | DiGiovanni et al. | 65/397 |
| 2009/0169163 | A1* | 7/2009 | Abbott et al. | 385/127 |

* cited by examiner

*Primary Examiner* — Daniel Petkovsek
(74) *Attorney, Agent, or Firm* — Michael J. Urbane

(57) ABSTRACT

Described is a method of fabricating an optical fiber preform that includes a deep index trench comprising a shallower outer trench portion formed on a substrate tube and a deeper inner trench portion formed on the shallower outer trench portion. Each of the shallower outer trench and deeper inner trench portions comprises multiple silica layers. The method comprises the steps of: (1) forming each layer of the shallower outer trench portion in a single-pass deposition of a F-containing silica layer; and (2) forming each layer of the deeper inner portion in a double-pass deposition in which, in a first pass, a layer of silica soot is deposited and then, in a second pass, the soot is sintered in the presence of $SiF_4$.

3 Claims, 5 Drawing Sheets

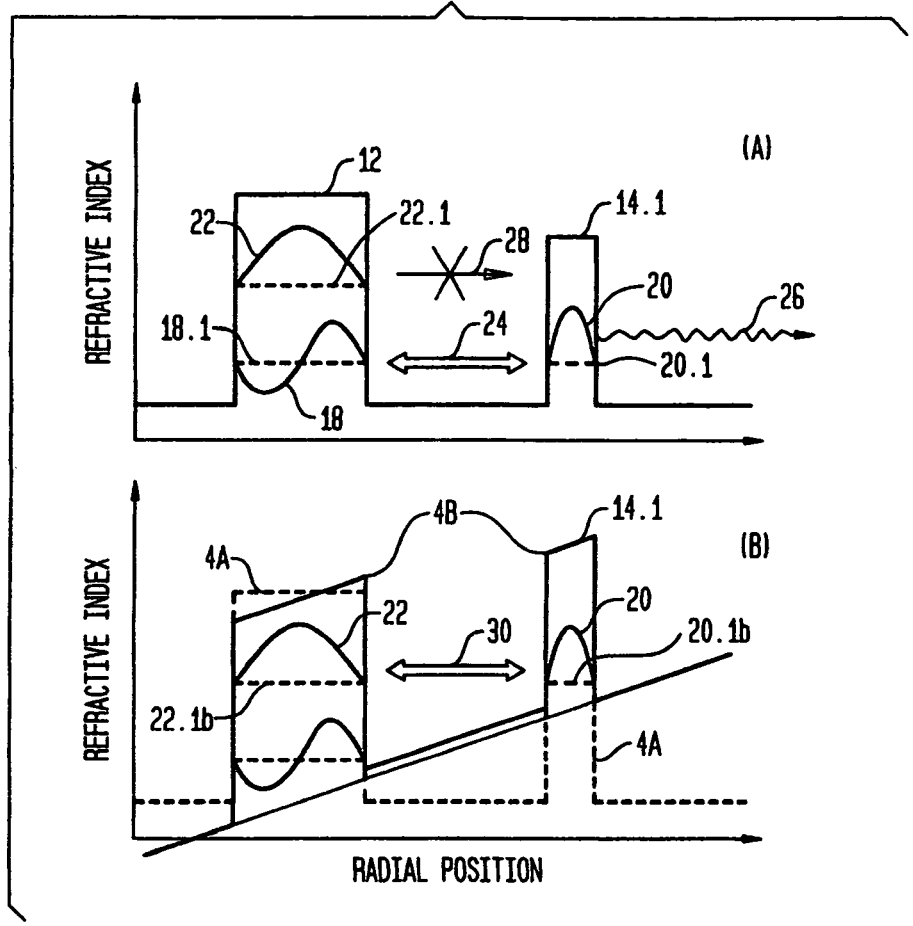

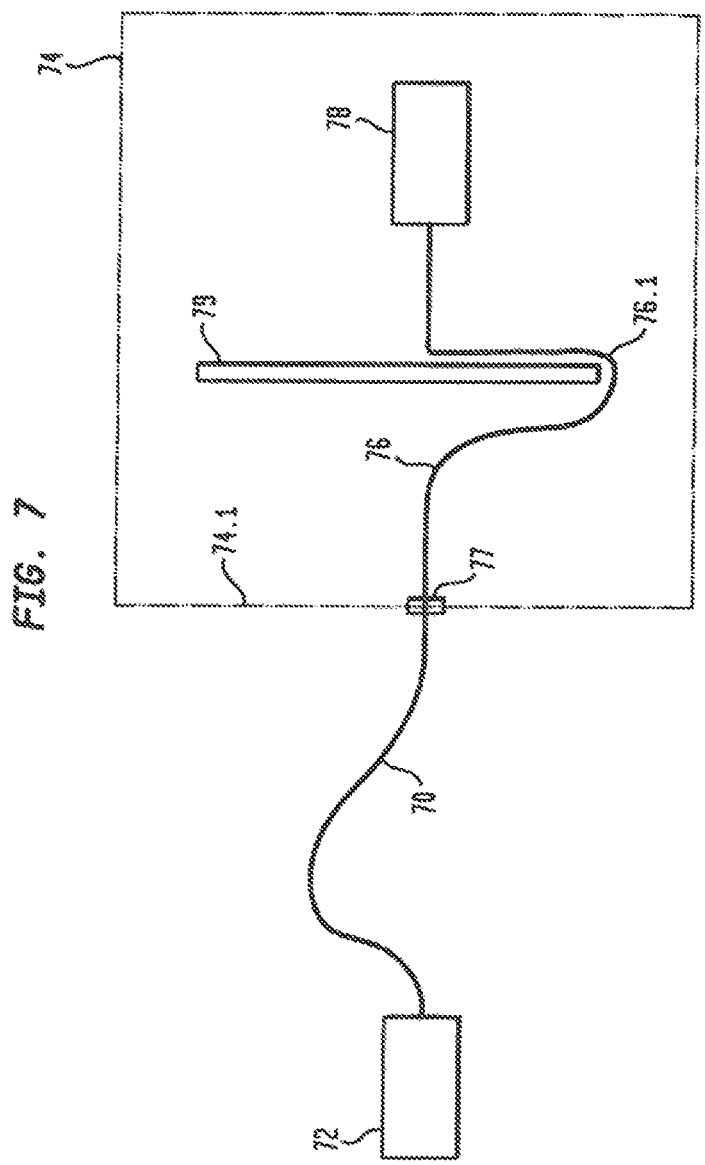

METHOD OF MAKING AN OPTICAL FIBER WITH TRENCH REGION IN ITS INDEX PROFILE

CROSS-REFERENCE TO RELATED APPLICATIONS

This application is a division of parent application Ser. No. 13/374,205 filed on Dec. 15, 2011 now U.S. Pat. No. 8,320,726, which is a division of grandparent application Ser. No. 12/472,522 filed on May 27, 2009 now U.S. Pat. No. 8,107,784, which is a continuation-in-part of great-grandparent application Ser. No. 12/072,869 filed on Feb. 28, 2008 now U.S. Pat. No. 8,374,472, which is in turn a continuation-in-part of great-great-grandparent application Ser. No. 11/818,780 filed on Jun. 15, 2007 now abandoned. The grandparent application also claims priority from provisional application Ser. No. 61/056,461 filed on May 28, 2008 and entitled "Low Bend Loss Fiber with Improved Fabrication and Tight-Bend Performance." These applications are incorporated herein by reference.

BACKGROUND OF THE INVENTION

1. Field of the Invention

This invention relates to a method of making an optical fiber having a trench region in its refractive index profile. In particular this invention is useful in making single mode optical fibers that have reduced bend sensitivity and catastrophic bend loss.

2. Discussion of the Related Art

In contrast with standard single mode optical fiber used, for example, in land line, undersea and metro systems, access fiber, which is typically located closer to the user, includes fiber-to the-home (FTTH), jumper cables, and FTTx fiber (e.g., fiber-to-the-curb, indoor wiring). Access fiber must not only interface in a low loss, reliable way with standard single mode fiber (SMF), which carries optical signals to the location being accessed (e.g., home, business, or other facility), but also must be relatively insensitive to the effects of bending, which is inherent in many of the access fiber applications.

Thus, in access fiber applications it is highly desirable to have fibers that combine low bend loss and good compatibility with existing infrastructure and standards. However, there is an inherent difficulty in achieving low bend loss without sacrificing properties important to compatibility, especially mode size, splice or connector loss, cutoff, and higher-order mode suppression. Ring-assisted or resonance-assisted fiber (RAF) designs alleviate these difficulties, but many previous RAF designs suffer from fabrication and bend range constraints. Fabrication constraints lead to higher cost and smaller preform size. In particular, the interior region (i.e., excluding the outer cladding) of a RAF has a refractive index profile fabricated using conventional vapor deposition techniques (e.g., MCVD). The various portions of the interior region (e.g., core, trench, ring/pedestal) have different refractive indices, which can be adjusted by doping with, for example, fluorine or creating hollow voids to produce a depressed-index region, or germanium to produce a raised-index region. Due to the large radial extent (cross-sectional area or volume) of the interior-region of a RAF compared to a conventional single mode fiber, a significant fraction of the fiber volume is deposited using the vapor-phase process. Since the deposition rate of such processes is relatively slow, this type of fiber material has relatively low throughput and hence relatively high cost.

Therefore, there is a need for a RAF design that allows at least a portion of the interior-region to be fabricated by a technique other than conventional, low-deposition-rate vapor deposition.

In addition to manufacturing cost, current RAFs exhibit an abrupt resonant coupling of fundamental mode signal light between the core and the ring, causing catastrophic optical loss at a critical bend radius, typically in the 3-5 mm range. Yet, recent industry studies have indicated that tight bend radii (2-4 mm) may occur in some installations and should be supported.

Therefore, there is also a need for a RAF design that alleviates the problem of catastrophic bend loss at a critical radius and provides low bend loss performance over a wider range of bend radii.

BRIEF SUMMARY OF THE INVENTION

In accordance with one aspect of our invention, an optical fiber that is relatively insensitive to bend loss and alleviates the problem of catastrophic bend loss comprises a core region and a cladding region configured to support and guide the propagation of light in a fundamental transverse mode, the cladding region including (i) an outer cladding region having a refractive index $n_{out}$ less than the refractive index $n_{core}$ of the core region, (ii) an annular pedestal (or ring) region having a refractive index $n_{ped}$, (iii) an annular inner trench region disposed between the core region and the pedestal region, the inner trench region having a refractive index $n_{tri}$ much less than that of the pedestal region, and (iv) an annular outer trench region disposed between the pedestal region and the outer cladding region, the outer trench region having a refractive index $n_{tro}$ less than that of the pedestal region and relatively close to that of the outer cladding region.

In order to suppress HOMs the pedestal region is configured to resonantly couple at least one transverse mode of the core region (other than the fundamental mode) to at least one transverse mode of the pedestal region.

In a preferred embodiment of our fiber, the refractive index and width (or thickness) of the pedestal and outer trench regions are configured so that the fiber has relatively low bend sensitivity combined with a reduced resonant loss peak. In particular, our fiber is configured so that, at a signal wavelength of approximately 1550 nm, its bend loss is no more than about 0.1 dB/turn at bend radius of 5 mm and is no more than about 0.02 dB/turn at a bend radius of 10 mm. To this end, the pedestal region is short and wide, whereas the outer trench region is shallow and wide; that is, $n_{ped}$ and $n_{tro}$ are both very close to $n_{out}$, but $n_{ped} > n_{tro}$ and $n_{out} > n_{tro}$. At even tighter radii in the 2-4 mm range our fiber exhibits comparably low bend loss; for example, at a bend radius of 3 mm the bend loss is no more than about 0.2 dB/turn, with some fibers having a bend loss of less than 0.1 dB/turn.

In addition, in one embodiment of our fiber, the core region also includes an inner core region and an annular outer core (or shelf) region surrounding the inner core region. The refractive index of the shelf region is less than that of the inner core region, and the thickness of the shelf region is less than the diameter of the inner core region. According to one aspect of this embodiment, the shelf region extends radially a distance of less than 9 μm from a longitudinal axis of the inner core region.

Furthermore, in another embodiment of our fiber, the inner trench region includes an annular inner portion and an annular outer (or step) portion surrounding said inner portion. The refractive index of the step portion is greater than that of the inner portion.

In a preferred embodiment, both of the foregoing features of the core region and the inner trench region are incorporated in our fiber.

Fibers designed in accordance with our invention may advantageously be used as access fiber, but may have other applications, such as fibers used in sensors or in vehicles.

In addition, fibers designed in accordance with our invention have improved manufacturability in that the ring/pedestal, shallow outer trench and/or the outer cladding regions may be produced using commercially available glass tubing, rather than by more expensive, low-deposition-rate techniques.

Thus, another aspect of our invention is a method of making the above-described RAF, comprising the steps of:
1) providing a first starting tube comprising silica and having an index $n_{ped}$;
2) depositing a multiplicity of down-doped first glass layers on the inside of the first tube; the first glass layers forming the deeper-index inner trench region;
3) depositing a multiplicity of up-doped second glass layers on the first layers; the second layers forming the core region;
4) collapsing the first tube to form a first rod;
5) providing a second tube comprising down-doped glass and having an index $n_{tro}$;
6) providing a third tube comprising silica and having an index $n_{out}$;
7) placing the first rod inside the second tube;
8) placing the second tube, with the first rod therein, inside the third tube; and
9) collapsing the third tube and second tube onto the first rod to form a fiber preform.

After step (9) well known techniques may be used to draw a fiber from the preform. By using multiple tubes [steps (1), (5) and (6)] the volume of silica glass formed by vapor deposition is dramatically reduced, with a concomitant decrease in the fabrication cost.

Variations of the foregoing method utilizing only two starting tubes are also contemplated by the fabrication techniques of our invention.

Furthermore, alternative methods for overcladding the first rod may be utilized in place of the second or third tubes, and/or alternative methods for creating the first rod may also be used, such as outside vapor deposition (OVD) or vapor-phase axial deposition (VAD).

As noted above, some embodiments of single mode fibers in accordance with our invention have a unique, stepped trench designed into their refractive index profiles. Thus, another aspect of our invention is a method of fabricating an optical fiber preform that includes a deep index trench region including a shallower outer trench portion formed on a substrate tube and a deeper inner trench portion formed on the outer portion. Each of the portions comprises multiple silica layers, and the method comprises the steps of: (1) forming each layer of the shallower outer portion in a single-pass deposition of a F-containing silica layer; and (2) forming each layer of the deeper inner portion in a double-pass deposition in which, in a first pass, a layer of silica soot is deposited and then, in a second pass, the soot is sintered in the presence of $SiF_4$. Illustratively, step (1) forms an outer portion having a refractive index of approximately $-7 \times 10^{-3}$ or more, and step (2) forms an inner portion having a refractive index of approximately $-7 \times 10^{-3}$ or less, where the refractive indices are measured relative to that of an outer cladding of the fiber. Of course, our method may also include a step of drawing a fiber from the preform.

BRIEF DESCRIPTION OF THE SEVERAL VIEWS OF THE DRAWING

Our invention, together with its various features and advantages, can be readily understood from the following more detailed description taken in conjunction with the accompanying drawing, in which:

FIG. 2 is a schematic graph of the refractive index profiles of a fiber with step-index core and an annular pedestal region used to suppress higher order modes (HOMs); FIG. 2A demonstrates the case for a straight fiber; FIG. 2B for a bent fiber;

FIG. 7 is a schematic block diagram of a generalized application of our access fibers.

Figures 1A, 1B:
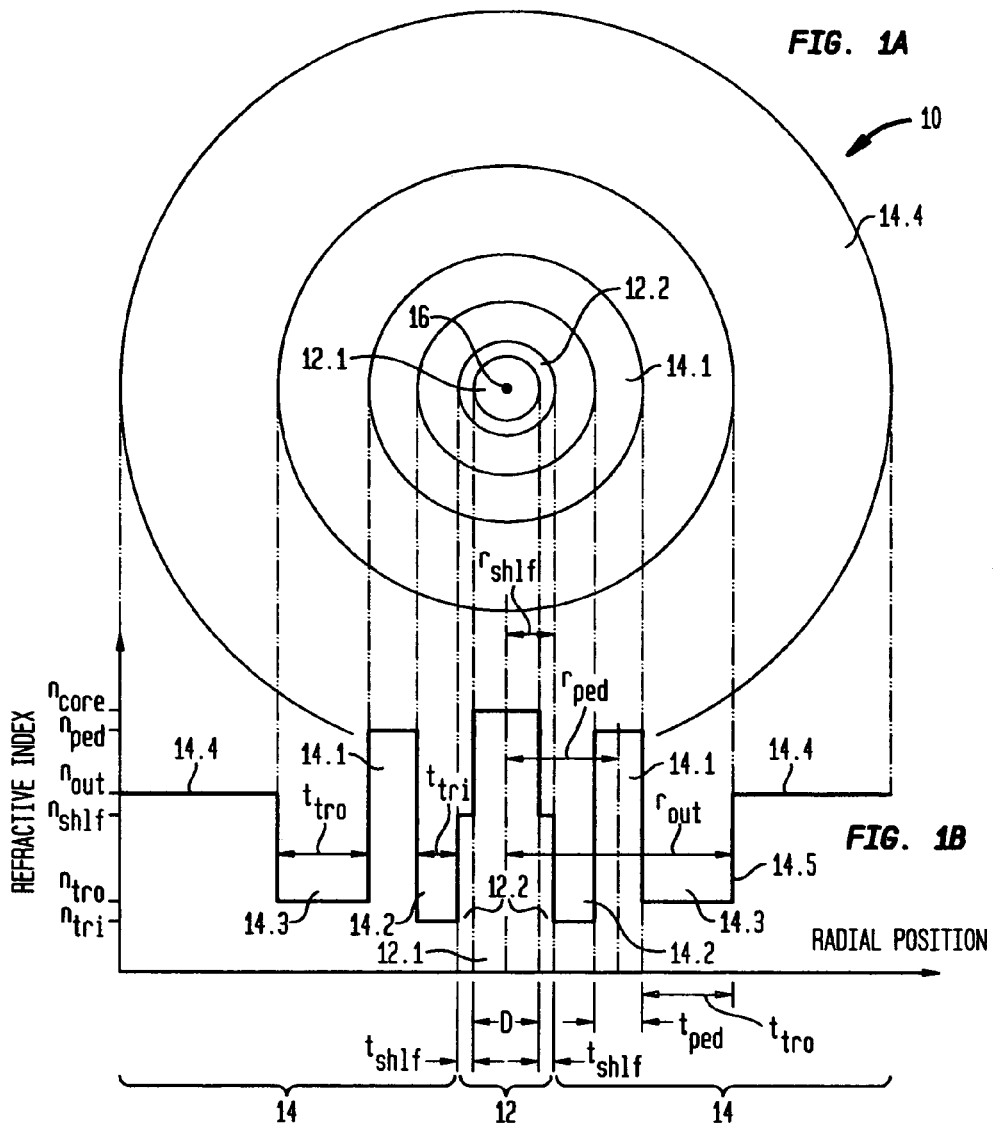
FIG. 1A is a schematic, cross-sectional view of a Type I RAF, which is described in copending parent application Ser. No. 12/072,869 (Fini 9-5), supra.
FIG. 1B is a schematic graph of the refractive index profile of the fiber of FIG. 1A.

Various ones of the foregoing figures are shown schematically in that they are not drawn to scale and/or, in the interests of simplicity and clarity of illustration, do not include all of the details of an actual optical fiber or product depicted.

GLOSSARY

Bending: Macro-bending, commonly referred to as simply bending, takes place when a fiber is bent or curled so that its curvature is relatively constant along its length. In contrast, micro-bending takes place when curvature changes significantly within the adiabatic length scale for a particular fiber (e.g., along fiber lengths on the order of a millimeter or less). Such micro-bends are formed, for example, in standard micro-bending tests by pressing the fiber into sand paper.

Center Wavelength: Throughout this discussion references made to wavelength are intended to mean the center wavelength of a particular light emission, it being understood that all such emissions have a characteristic linewidth that includes a well-known range of wavelengths above and below the center wavelength.

Effective Radius: By effective radius we mean the average of the inside and outside radii of an annular region such as a pedestal region or a trench region of a fiber.

Glass Fiber: Optical fiber of the type described herein is typically made of glass (e.g., silica) in which the refractive indices of the core region and of the cladding region are controlled by the amount and type of one or more dopants (e.g., P, Al, Ge, F) or by hollow voids incorporated therein during the fabrication of the fiber, as is well known in the art. These refractive indices, as well as the thicknesses/diameters of core/cladding regions, determine important operating parameters, as is well known in the art.

Index: The terms index and indices shall mean refractive index and refractive indices.

Index Profile: The schematic index profiles of FIGS. 1B, 1C, 1D and 3 are averages of the actual variations of index that would be observable in an optical fiber. In addition, although various regions of these profiles are shown as being rectangular, the boundaries of such regions need not be horizontal or vertical; one or more may be slanted, for example, the region may be trapezoidal.

Mode: The term mode(s) shall mean the transverse mode(s) of an electromagnetic wave (e.g., signal light).

Mode size: The size of an optical mode is characterized by its effective area $A_{eff}$, which is given by:

$$A_{eff} = \frac{\left(\int |E|^2 dA\right)^2}{\int |E|^4 dA}$$

where E is the transverse spatial envelope of the mode's electric field, and the integrations are understood to be performed over the cross-sectional area of the fiber. When the mode-field shape is close to an axisymmetric (i.e., symmetric about the longitudinal axis of rotation of the fiber) Gaussian function, the mode-field diameter (MFD) is an appropriate metric for the diameter of the mode and may be expressed as:

$$MFD = 2\sqrt{\frac{2\int |E|^2 dA}{\int \left|\frac{dE}{dr}\right|^2 dA}}$$

where r is the radial coordinate. When the mode-field shape is exactly equal to an axisymmetric Gaussian function, then $A_{eff} = \pi \times MFD^2/4$.

Radius/Diameter: Although the use of the terms radius and diameter in the foregoing (and following) discussion implies that the cross-sections of the various regions (e.g., core, pedestal, trench, cladding) are circular and/or annular, in practice these regions may be non-circular; for example, they may be elliptical, polygonal, irregular or other more complex shapes. Nevertheless, as is common in the art, we frequently use the terms radius and/or diameter for simplicity and clarity.

Resonant Coupling: By the terms resonant or resonantly coupled we mean that the effective refractive index ($n_{eff}$) of an unwanted mode (e.g., a HOM) in the core region is essentially equal to that of a mode in the pedestal region. As explained more fully in the description that follows, this phenomenon is used to suppress unwanted HOMs in RAF fibers designed in accordance with various embodiments of our invention.

Signal Propagation: Although signal light may actually crisscross the longitudinal axis as it propagates along a fiber, it is well understood in the art that the general direction of propagation is fairly stated as being along that axis (e.g., axis 16 of FIG. 1A).

Single Mode: References made to light propagation in a single transverse mode are intended to include propagation in essentially a single mode; that is, in a practical sense perfect suppression of all other modes may not always be possible. However, single mode does imply that the intensity of such other modes is either small or insignificant for the intended application.

Suppressed HOM: The degree to which an HOM needs to be suppressed (or cut-off) depends on the particular application. Total or complete suppression is not demanded by many applications, which implies that the continued presence of a relatively low intensity HOM may be tolerable. In any event, suppressing HOMs improves system performance by, for example, reducing total insertion loss, lowering noise in the signal mode, and lowering microbend loss.

Undoped: The term undoped or unintentionally doped means that a region of a fiber, or a starting tube used to form such a region, contains a dopant not intentionally added to the region during fabrication, but the term does not exclude low levels of background doping that may be inherently incorporated during the fabrication process. Such background doping levels are low in that they have an insignificant effect on the refractive index of the undoped region.

DETAILED DESCRIPTION OF THE INVENTION

The design of optical access fibers for typical practical applications involves consideration of three interrelated requirements: (i) relatively low bend loss (i.e., low bend sensitivity) for a bend radius within a predetermined range (e.g., approximately 2-15 mm); (ii) suppression of HOMs (i.e., relatively low cutoff wavelength for the HOM(s) to be suppressed); and (iii) mode-area matching to standard SMF (e.g., good connectorization and/or splicing to standard fiber, such as SMF 28 commercially available from Corning, supra). Below we describe first what we term Type I RAF designs of the type described in our parent application Ser. No. 12/072, 869 (Fini 9-5), supra. Then, we described Type II RAFs in accordance with the present invention and compare their design and performance to those of Type I RAFs.

Type I RAF Design—Bend Insensitivity Considerations

With reference now to FIGS. 1A and 1B, an optical fiber 10 in accordance with parent application Ser. No. 12/072,869 (Fini 9-5), supra, has relatively low bend loss and, as such, is suitable for a variety of access or sensor fiber applications. Fiber 10 includes a core region of diameter D 12 surrounded by a cladding region 14, with the core and cladding regions being configured to support and guide the propagation of signal light (radiation) axially along a longitudinal axis 16 located at essentially the center of the core region 12.

Although core region 12 is depicted as having a two-layer profile (i.e., a profile with two essentially constant or uniform index regions), it could also have a step-index, multi-step, or graded-index profile.

In accordance with one embodiment of a Type I RAF as described in the aforesaid parent application, the cladding region 14 includes an annular outer cladding region 14.4 (inside edge at $r_{out}$), an annular, elevated index, pedestal region 14.1 (effective radius at $r_{ped}$; thickness $t_{ped}$), an annular, depressed index, inner trench region 14.2 disposed between the core region 12.1 and the pedestal region 14.1, and an annular, depressed index, outer trench region 14.3 disposed between the pedestal region 14.1 and the outer cladding region 14.4.

Other coatings (not shown; e.g., glass or polymer coatings) may surround the outer cladding region 14.4, as is well known in the art, for protection, strength, ease of handling, or other purposes, but do not affect the optical properties of the fiber.

The refractive index ($n_{ped}$) of the pedestal region 14.1 is higher than the refractive index ($n_{out}$) of the outer cladding region 14.4. In addition, the refractive indices ($n_{tri}$, $n_{tro}$) of both the inner and outer trench regions are lower than that of the outer cladding region 14.4; that is, $n_{ped} > n_{out}$, $n_{tri} < n_{out}$, and $n_{tro} < n_{out}$. (Not all of these inequalities are requirements of Type II RAFs in accordance with the present invention, as discussed infra.) As discussed below, the fiber 10 in general, and the pedestal region 14.1 in particular, is configured to suppress preselected (unwanted) HOMs of the core region.

In general, the inner and outer trench regions provide confinement of the various fiber modes. The amount or level of confinement for any mode near cutoff can be quantified by the expression $(n_{tr} - n_{out})t_{tr}$, where $n_{tr}$ and $t_{tr}$ are the index and thickness of a trench region. For a Type I RAF, the level of such confinement provided by each of the trench regions should preferably satisfy the following condition:

$$0.5 < [(n_{tri} - n_{out})t_{tri}]/[(n_{tro} - n_{out})t_{tro}] < 2.0, \quad (1a)$$

where $t_{tri}$ and $t_{tro}$ are the thicknesses of the inner and outer trench regions, respectively.

In one embodiment also described in the aforesaid parent application, the core region 12 includes an inner core region 12.1 surrounded radially by an annular outer core region (or shelf region) 12.2. The index of the inner core region 12.1 is greater than that of the shelf region 12.1; that is, $n_{core} > n_{shlf}$. The shelf region has a radial thickness $t_{shlf}$ and its outside edge is positioned at a radius $r_{shelf} = D/2 + t_{shlf}$.

Although Type I RAFs that include the shelf region 12.2 are described in our parent application as being optional, in one embodiment of the present invention Type II RAFs with this design feature are preferred. In designs of Type I RAFs where the shelf region is omitted, the core region 12 would simply include only the inner core region 12.1, with the thickness of the inner trench region 14.2 being increased by the thickness of the omitted shelf region. As discussed below, in either case, the core region 12 is configured to produce a fundamental mode $A_{eff}$ that matches that of a standard SMF.

Bend loss, of course, should be as low as possible. In particular, it should be less than that of a standard SMF at important operating wavelengths (e.g., 1300 nm, 1550 nm, and 1650 nm) for any bend radius in the range of approximately 2-15 mm. To this end, at least one trench region 14.2, 14.3 (and preferably both) should provide a total contrast much higher than that of a standard SMF. Illustratively, SMF 28 has a total contrast of about $5 \times 10^{-3}$ (in units of refractive index). In Type I RAFs described in our parent application, the total contrast of fiber 10 is given by $$|n_{tri} - n_{core}| > 0.007, \text{ and/or} \quad (1)$$

$$|n_{tro} - n_{core}| > 0.007 \quad (2)$$

Figure 1C:
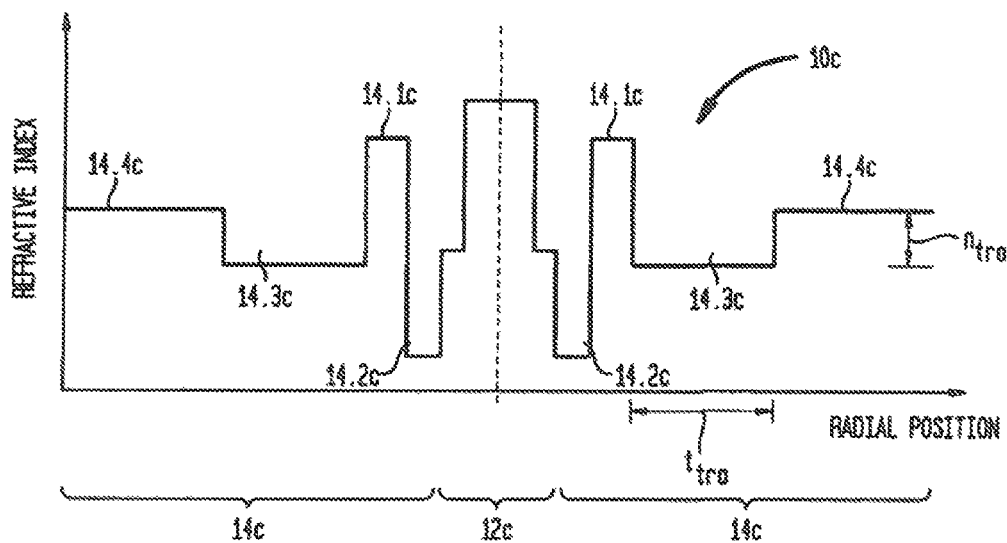
FIG. 1C is a schematic graph of the refractive index profile of an inventive (Type II) RAF in which the outer trench is shallower, in accordance with one embodiment of the invention described in our parent application.
Figure 1D:
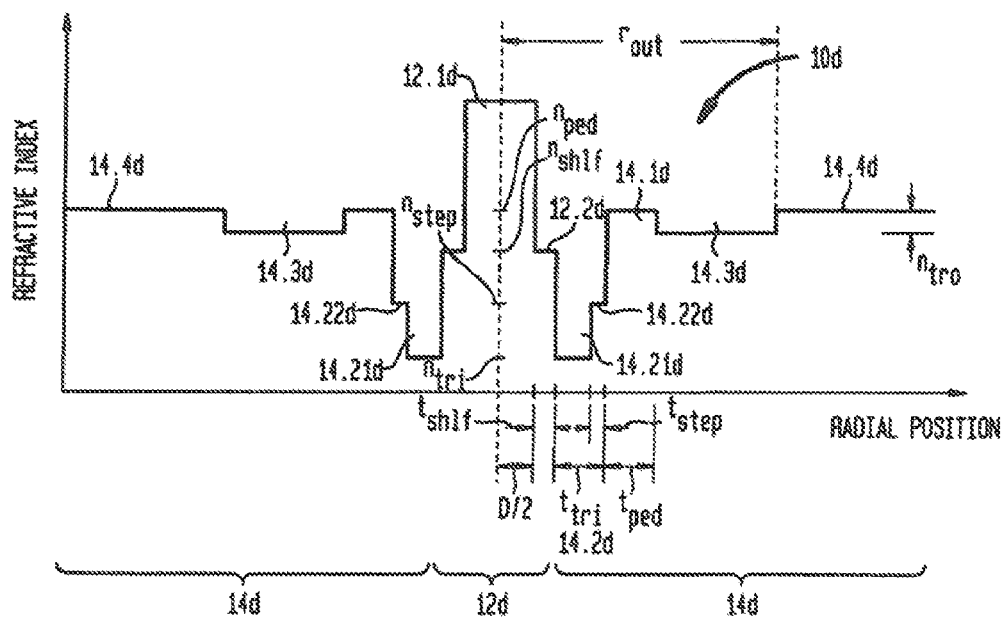
FIG. 1D is a schematic graph of the refractive index profile of Type II RAF in accordance with one embodiment of the present invention illustrating a combination of features: a shallow outer trench, a short pedestal, a core region shelf, and an inner trench region step.
Figure 3:
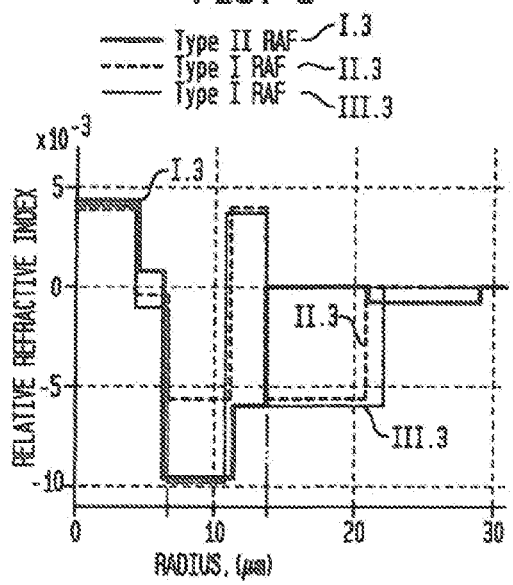
FIG. 3 is a schematic graph of the refractive index profile of a Type II RAF (solid curve I.3), in accordance with one embodiment of our invention, compared to the index profiles (dashed curves II.3, III.3) of two Type I RAFs as shown in FIG. 1B. Refractive index values are given relative to that of the outer cladding region.

Illustratively at least the inner trench-to-core contrast of equation (1) is approximately 0.008-0.020, and preferably both the inner and outer trench-to-core contrasts satisfy this condition for all embodiments except the shallow-trench, Type II RAF embodiments shown in FIGS. 1C, 1D and 3.

In addition, the interface 14.5 (at $r_{out}$) between the outer cladding region 14.4 and the outer trench region 14.3 should be at a radius in the range of approximately 17-23 μm (17-30 μm in the shallow-trench design, infra), and the refractive index of the core and pedestal regions are comparable; that is, $$|n_{core} - n_{ped}| < 0.003 \quad (2a)$$

The outer trench region 14.3 of Type I RAF 10, as shown in FIG. 1B, is depicted as being relatively narrow (radial thickness $t_{tro}$) and relatively deep (index $n_{tro} \ll n_{out}$). By deep we mean that $n_{tro}$ is more than about 0.0020 below $n_{out}$. The narrowness of outer trench region is not critical.

In any of these embodiments the pedestal region (or ring) may be formed in a straight-forward, well-known manner by introducing index-increasing dopants (e.g., Al, Ge, P in silica) into the region during vapor deposition. As illustrated by fiber 10 of FIGS. 1A-1B, in each radial cross-section of the fiber, the ring 14.1 would have a substantially uniform index circumferentially. However, as described in the aforesaid parent application, the index of the ring may be rendered non-uniform circumferentially by means of longitudinally extending, radially localized, well-known features such as index-lowering airholes and/or index-raising inclusions. As with the core, rings and trenches, these features may have various cross-sectional shapes including circles, ellipses and polygons. In such designs, the principle of HOM suppression is still that pedestal modes efficiently couple to unwanted core-guided modes when their effective indices are nearly the same. The effective index of pedestal modes can be calculated and index-matched using standard methods for fibers with arbitrary cross-section, and so the designs are conceptually the same as for the special case of an annulus having an essentially uniform or constant index. However, the use of features with desirable shapes may provide advantages; for example, they may provide index-matching over a wider wavelength range than is possible for a uniform-index annulus.

Alternatively, the pedestal region may be a virtual ring; that is, the ring need not have a well-defined circumferential (annular) boundaries formed by standard doping during vapor deposition. Instead, the pedestal region may be formed entirely by a suitably placed array of features: airholes, inclusions, or both.

In a similar fashion, as also described in the aforesaid parent application, the inner trench and/or the outer trench may include an array of suitably spaced airholes that decrease the effective index seen by the propagating signal mode. This approach may be used when the trenches are formed by vapor deposition or by use of tubes, if the added complexity/expense can be tolerated in customer's intended application.

Finally, as also described in the aforesaid parent application, the fiber may also include multiple, concentric rings, and it may be advantageous to include a loss region of scattering or absorption centers, for example, adjacent an outer ring.

Type I RAF Design-Mode Matching Considerations

Because access fiber applications often entail splicing or otherwise coupling the access fiber to a standard single mode transmission fiber, it is important that the $A_{eff}$ of the access fiber be matched to that of the standard SMF (e.g., the standard SMF 28 fiber available from Corning, supra). In current practice, this requirement means that the access fiber should also be effectively single-moded and should have an $A_{eff}$ of about 70-90 μm² at signal wavelengths of approximately 1550 nm and an $A_{eff}$ of about 55-70 μm² at signal wavelengths of approximately 1300 nm. Typically, for an access fiber core region having a circular cross-section, the access fiber should have an inner core diameter D of about 8-11 μm approximately.

For simplicity the following exposition, taken from our parent application, will focus on the design of Type I RAF 10 of FIGS. 1A-1B. However, it will apparent to those skilled in the art that similar considerations apply to the Type II RAF embodiments of FIGS. 1C, 1D and 3. The $A_{eff}$ of fiber 10 is controlled primarily by two parameters: the index contrast Δn between the core region 12.1 and the inner trench region 14.2;

that is, $\Delta n = (n_{core} - n_{tri})$ and a radial width or core area of the core region 12; that is, in the case of a circular cross-section, the diameter D of the core region, but in the case of a non-circular cross-section, the core area. More specifically, for a given D, when the index contrast is decreased, the confinement of the fundamental mode field decreases, which means that its $A_{eff}$ increases. However, reduced mode confinement means the fiber acts as a poorer waveguide and optical losses increase, particularly when the fiber is subject to sharp bends (e.g., a bend radius of 2-15 mm) On the other hand, for a given $\Delta n$, when the diameter of the core region 12 increases, the $A_{eff}$ increases (roughly as diameter squared), but the number of HOMs supported also increases. In general, the presence of significant energy in HOMs may be undesirable; for example, optical loss increases if the fiber is subject to micro-bending.

In the alternative embodiment of FIG. 1 in which the outer core region (or shelf) 12.2 is omitted, the total contrast (i.e., $n_{core} - n_{tri}$, or $n_{core} - n_{tro}$, or both) should still satisfy inequalities (1) and/or (2), the core diameter D should be in the range of approximately $$8 \ \mu m \leq D \leq 11 \ \mu m, \quad (3)$$

and the index of the outer cladding region 14.4 should satisfy $$0.003 \leq (n_{core} - n_{out}) \leq 0.006 \quad (4)$$

approximately. Note, if this contrast is too high, HOMs tend to be introduced in the core region, but these HOMs are suppressed using the design described in the following section.

An alternative Type I RAF fiber design for meeting the conflicting requirements of reducing bend loss and matching $A_{eff}$ to that of standard SMF is also shown in FIG. 1. More specifically, the core region 12 includes a thin, lower index, annular, shelf region 12.2 surrounding inner core region 12.1, as shown in FIG. 1. Shelf region 12.2 allows the $A_{eff}$ to be increased to match that of a standard SMF. The shelf region 12.2 is relatively thin or narrow; that is, it has a thickness $t_{shlf}$ that is much less than the diameter D of the inner core region 12.1. Illustratively, $D \gg t_{shlf}$ and $$1.0 \ \mu m \leq t_{shlf} \leq 4.0 \ \mu m \quad (5)$$

approximately when D=8-11 µm.

In addition, the index $n_{shlf}$ of the shelf region 12.2 is less than that of the inner core region 12.1; that is, $n_{shlf} < n_{core}$. Typically, $(n_{core} - n_{shlf}) < 0.007$ approximately, which is similar to the index contrast (0.005) of a standard SMF. Preferably, $n_{shlf}$ satisfies the following inequalities $$0.003 \leq (n_{core} - n_{shlf}) \leq 0.007, \text{ and} \quad (6)$$

$$|n_{shlf} - n_{out}| \leq 0.002 \quad (6a)$$

approximately, and D is the range of approximately 8-10 µm. In this preferred design, the outside edge of the shelf region should be located at a radius $r_{shelf} = D/2 + t_{shlf}$, which is less than 9 µm and more than 5 µm.

The foregoing design details of the core region 12 facilitate not only mode matching but also HOM suppression, which is discussed in the following section.

In addition, these aspects of inner core region 12.1 and shelf region 12.2 are applicable to our Type II RAF designs described infra.

Type I RAF Design—HOM Considerations

In order to suppress HOMs in a Type I RAF, the cladding region 14 of fiber 10 includes pedestal region 14.1, which has a higher index $n_{ped}$ than the remainder of the cladding region; that is, the pedestal region 14.1 is bounded radially by at least a lower index $(n_{tri})$ inner trench region 14.2 and, in some embodiments, also by a lower index $(n_{tro})$ outer trench region 14.3. In addition, it has a higher index than the index $(n_{out})$ of the outer cladding region 14.4. In the discussion of Type I RAFs that follows, we assume for purposes of exposition a dual-trench design, with the understanding that similar principles apply to the single (inner)-trench design.

The pedestal region 14.1 is configured so that at least one of its (ring) modes resonantly couples with at least one unwanted HOM of the core region 12. As shown in the simplified index profile of FIG. 2A, preferably HOM 18 (illustratively depicted as an $LP_{11}$ mode) of the core region 12 is resonant with a mode 20 of the pedestal region 14.1, whereas the fundamental mode 22 of the core region is not resonant with any mode of the pedestal region. The mode 20 is typically one of the ring modes of pedestal region 14.1 with the highest or nearly the highest effective index, and the mode 20 is not forbidden by well-known symmetry principles from coupling to the HOM 18 of the core region.

By the terms resonant or resonantly coupled we mean that the effective refractive index ($n_{eff}$) of an unwanted mode in the core region is essentially equal to that of a mode in the pedestal region. Thus, the $n_{eff}$ 18.1 of the unwanted mode 18 of the core region 12 is essentially equal to the $n_{eff}$ 20.1 of the mode 20 of the pedestal region 14.1, which allows energy in HOM 18 to transfer or couple (arrow 24) from the core region into mode 20 of the pedestal region and from there to radiate into the outer cladding region 14.4. (Arrow 26 indicates such radiation via leaky cladding modes, which are usually present. Alternatively, this energy may be lost due to absorption, scattering, etc.) After a suitable propagation distance along the fiber, this process of resonant transfer and radiation effectively suppresses HOM 18 in the core region. In contrast, $n_{eff}$ 22.1 of the fundamental mode 22 of the core region does not correspond to the $n_{eff}$ of any mode in the pedestal region. Consequently, the fundamental mode 22 propagates effectively in the core region, and no resonant transfer of its energy (negated arrow 28) into the pedestal region takes place.

The condition that a core region mode and a pedestal region mode have essentially equal refractive indices means, for example, that the core region HOM index 18.1 and the pedestal region mode index 20.1 are not so different that coupling of light between these modes is significantly frustrated. In a preferred embodiment of the invention, the difference between indices 18.1 and 20.1 is much less than the difference between the core fundamental mode index 22.1 and the pedestal mode index 20.1.

Proper coupling between a core region mode to be suppressed (i.e., the unwanted mode) and the resonant pedestal region mode should also take into account the need to reduce coupling of the latter pedestal mode back into the former core mode.

The fiber 10 should also be configured to allow effective leakage of unwanted core modes through the pedestal modes. In this regard, see the discussion above in conjunction with equations (2a) and (2b).

In addition, the coupling between the core region and the pedestal region should not be so large that the desired (fundamental) core mode is disrupted. On the other hand, the coupling between the core region and the pedestal region should not be too small that unwanted core modes will not couple sufficiently to pedestal modes to be suppressed. Next, the leakage rate of the pedestal mode should not be so large that coupling between the core and pedestal region is frustrated (i.e., insufficient). Finally, the leakage rate of the pedestal mode should not be so small that unwanted core modes will experience too little loss to be effectively suppressed.

Adherence to these design principles assures that in the core region 12, for example, fundamental mode 22 is effectively propagated, whereas HOM 18 (or any other unwanted HOM) is effectively suppressed. The degree to which the HOM needs to be suppressed (or cut-off) depends on the particular application. Total or complete suppression is not demanded by many applications, which implies that the continued presence of a relatively low intensity HOM may be tolerable. In any event, suppressing HOMs improves system performance by, for example, reducing total insertion loss, lowering noise in the signal mode, and/or lowering microbend loss.

Thus, resonant coupling enables our RAFs to operate in a single mode; e.g., in the fundamental mode 22 (FIG. 2A) of the core region.

When our dual trench, ring fiber is properly designed to effect index matching (or resonance) between unwanted HOM core modes and particular ring modes, then the slope of core mode and ring mode index curves is nearly the same, especially in the region where they intersect. Consequently, index-matched coupling between the core and ring modes is achieved over a relatively wide wavelength range (i.e. broadband).

The effect of bending on the Type I RAF of FIG. 2A is shown in FIG. 2B. The index profile 4A before bending is skewed as shown by profile 4B, resulting in an increase in $n_{eff}$ 20.1b of the mode 20 of the pedestal region 14.1. If the bend radius is sufficiently small, the cladding mode 20 may become resonant with the fundamental mode 22 of the core region 12, as shown by arrow 30. Such resonance would disadvantageously and dramatically increase the optical loss of the fundamental core mode 22 (also known as catastrophic bend loss). Accordingly, the pedestal region 14.1 needs to be configured to accommodate the expected bend radius without causing the fundamental core mode 22 to be resonant with any cladding mode, in particular with the cladding mode 20. The problem of catastrophic bend loss is addressed by the Type II RAF of the present invention, as discussed below.

The foregoing principles of resonant coupling (index matching) may also be applied to the suppression of multiple unwanted core modes either by resonantly coupling them to a single, mode of a pedestal region or by resonantly coupling them to different modes of one or more pedestal regions, each core mode being resonant with a separate pedestal mode.

In addition, the foregoing principles of resonant coupling are also applicable to Type II RAFs in accordance with the present invention, as described infra.

Type II RAFs—Shallow Outer Trench

In this section we discuss alternative embodiments (Type II RAFs) of the above-described RAFs. In Type II RAFs described in our parent application, the outer trench region is shallower and wider relative to the corresponding region of Type I RAFs. One embodiment of such a Type II RAF is shown in the index profile of FIG. 1C. The outer trench region 14.3c of fiber 10c is shallower. By shallow we mean that the index $n_{tro}$ of the outer trench region is relatively close to that of the outer cladding region, and by relatively close we mean $n_{tro}$ is less than about 0.002 above or below $n_{out}$. In addition, FIG. 1C also depicts the shallow outer trench region 14.3c as being wider that the inner trench region 14.2c, but, as with the design of FIG. 1B, the width (thickness) $t_{tro}$ of the outer trench region 14.3c is not critical.

At first blush it appears that this shallow-trench design contravenes the design principle defined by equation (1a); that is, the level of confinement provided by each of the trenches should be roughly the same. In a large portion of the design space, combining a highly confining (deep) inner trench with a much less confining (shallower) outer trench gives relatively poor HOM suppression, in part because the ring modes of the pedestal region 14.1 become too lossy and too isolated from the core modes, which interferes with the very purpose (HOM suppression) of the pedestal region, discussed supra. However, we have found a design space where good performance is obtained despite the having two trenches with very dissimilar levels of confinement; that is, where:

$$[(n_{tri}-n_{out})t_{tri}]/[(n_{tro}-n_{out})t_{tro}]>2.0, \quad (2b)$$

e.g., where the left hand side of equation (2b) is illustratively in the range of about 5-9. In this design space, pedestal modes are not well confined to the pedestal region; that is, they extend into the outer trench region and have large losses due to tunneling into the outer cladding. Poor confinement of the pedestal mode tends to degrade the HOM suppressing performance of these fibers, but this disadvantage is balanced by the enhanced bend loss performance of these designs. When bent, the pedestal modes of the fiber become extremely lossy making the fiber immune to the catastrophic bend loss effect discussed supra in conjunction with FIG. 2B.

In the Type II index profile of the RAF of FIG. 1C, as well as in the Type I RAFs of FIGS. 1A-1B, the pedestal/ring region 14.1c is depicted as having an index that is significantly greater than that of the outer cladding region 14.4c. However, we have found that this particular feature is not essential in shallow outer trench embodiments of our invention, as shown, for example, in Type II RAF 10d of FIG. 1D. Here, the refractive index of the pedestal region 14.1d ($n_{ped}$) is relatively close to that of the outer cladding region 14.4d ($n_{oc}$) but is still greater than the refractive indices of the shallow outer trench region 14.3d ($n_{tro}$) and the deeper inner trench region 14.2d ($n_{tri}$, $n_{step}$). The refractive index of the shallow outer trench region 14.3d preferably is relatively close to that of the outer core region 14.4d, as mentioned previously.

In one embodiment, the core region 12d of our Type II RAF 10d also includes an inner core region 12.1d and an outer core or shelf region 12.2d, as described above in conjunction with Type I RAFs. As discussed previously, the radius of the shelf ($r_{shelf}$) is preferably less than 9 μm and greater than about 5 μm in order to reduce bend sensitivity. In another embodiment, the inner trench region 14.2d includes a deeper inner portion 14.21d and a shallower outer portion or step 14.22d; that is, the refractive index of the shallower step 14.22d ($n_{step}$) is greater (less negative) than that of the deeper inner portion 14.21d ($n_{step}$). In a preferred embodiment, as depicted in FIG. 1D, both of the latter features (shelf 12.2d and step 14.22d) are included in the fiber design. Illustratively, as shown in Table I below, the radius of the inner core (D/2) is about 2.5 times the thickness of the shelf region 12.2d ($t_{shelf}$), and the thickness of the inner portion 14.21d of the inner trench region 14.2d is about 2 times the thickness of the step 14.22d, but neither of these ratios is critical. Different ratios can be used with appropriate, readily calculated, adjustments in other design parameters.

Type II RAFs of our preferred design have exceptional bend loss performance characteristics—at a signal wavelength of approximately 1550 nm, they exhibit bend loss of no more than about 0.1 dB/turn at bend radius of 5 mm and no more than about 0.02 dB/turn at a bend radius of 10 mm.

Type II RAFs—Performance & Design Principles

In order to demonstrate the enhanced performance of our Type II RAF, we compare it with two designs of Type I RAFs of the type described in our parent application. The index profiles of the three RAFs are shown in FIG. 3, where solid curve I.3 is the profile of a Type II RAF (with a deep inner trench and shallow outer trench) in accordance with the present invention, dashed curve II.3 is the profile of a Type I RAF (with medium contrast inner and outer trenches), and dot-dashed curve III.3 is the profile of another Type I RAF (with a high contrast, deep inner trench and a medium contrast outer trench).

The specific design parameters of these fibers are listed in Table I below:

TABLE I

| Design Parameter | Type II RAF (FIG. 3; profile I.3) | Type I RAF (FIG. 3; profile II.3) | Type I RAF (FIG. 3; profile III.3) |
|---|---|---|---|
| Core: $n_{core}$ | $4.2 \times 10^{-3}$ | $3.9 \times 10^{-3}$ | $4.1 \times 10^{-3}$ |
| D | 9.2 µm | 8.7 µm | 8.9 µm |
| $n_{shlf}$ | $0.7 \times 10^{-3}$ | $-0.4 \times 10^{-3}$ | $-1.0 \times 10^{-3}$ |
| $t_{shlf}$ | 1.8 µm | 2.2 µm | 2.3 µm |
| $r_{shlf}$ | 6.4 µm | 6.6 µm | 6.7 µm |
| Trench: $n_{tri}$ | $-9.6 \times 10^{-3}$ | $-5.7 \times 10^{-3}$ | $-9.7 \times 10^{-3}$ |
| $t_{tri}$ | 5.0 µm | 4.7 µm | 6.7 µm |
| $n_{step}$ | $-6.0 \times 10^{-3}$ | not applicable | not applicable |
| $t_{step}$ | 2.4 µm | not applicable | not applicable |
| Pedestal: $n_{ped}$ | 0 | $3.9 \times 10^{-3}$ | $3.6 \times 10^{-3}$ |
| $t_{ped}$ | 7.3 µm | 2.6 µm | 3.0 µm |
| $r_{ped}$ | 17.5 µm | 12.6 µm | 12.2 µm |
| Trench: $n_{tro}$ | $-0.8 \times 10^{-3}$ | $-5.7 \times 10^{-3}$ | $-6.0 \times 10^{-3}$ |
| $t_{tro}$ | 7.3 µm | 7.2 µm | 8.6 µm |
| Outer clad: $n_{out}$ | 0 | 0 | 0 |
| $r_{out}$ | 28.5 µm | 21.0 µm | 22.3 µm |

Figure 4:
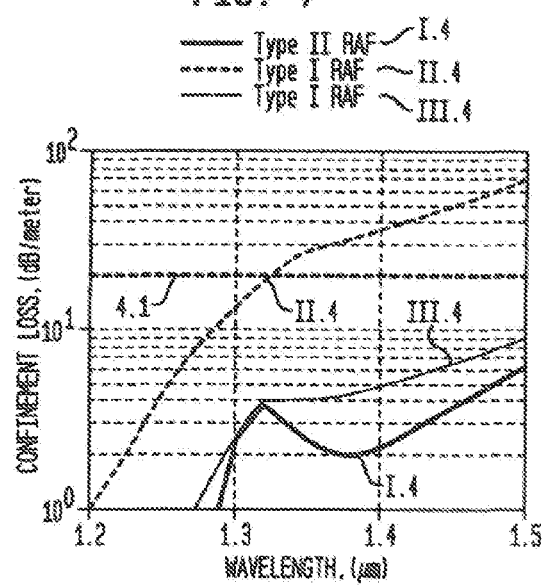
FIG. 4 is a graph of simulated HOM confinement loss vs. wavelength for the three RAFs depicted in FIG. 3.
Figure 5:
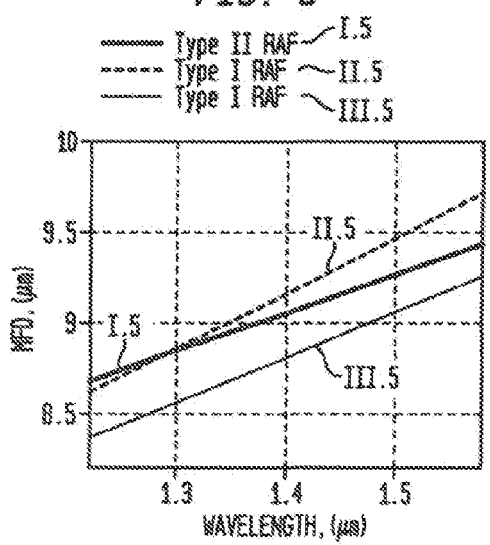
FIG. 5 is a graph of simulated mode-field diameter (MFD) vs. wavelength for the three RAFs depicted in FIG. 3.
Figure 6:
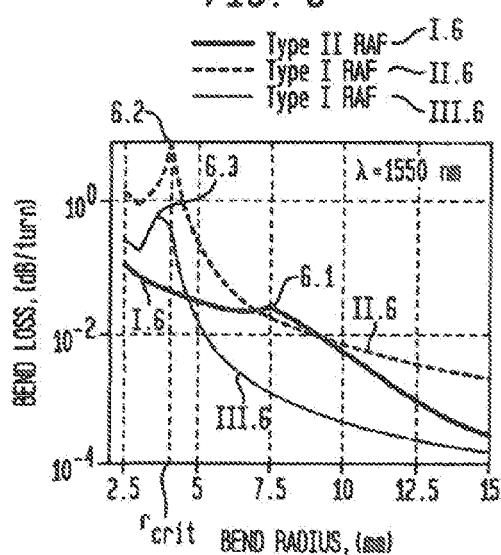
FIG. 6 is a graph of simulated bend loss vs. bend radius for the three RAFs depicted in FIG. 3. The simulation was made at a signal wavelength of 1550 nm. Similar simulations can be made a longer wavelengths, where we would expect the bend losses to be higher, and can be made at shorter wavelengths, where we would expect the bend losses to be lower.

The calculated performance of the three RAFs is summarized in FIG. 4 (HOM confinement loss vs wavelength, which is related to cutoff and MPI), FIG. 5 (MFD vs wavelength, which is related to splicing and connectorization loss), and FIG. 6 (bend loss vs bend diameter, which quantifies how sensitive the fiber is to bending). The tradeoffs among these three parameters are discussed below.

Bend Loss:

Comparing the two Type I RAFs, FIGS. 4-6 demonstrate that the Type I RAF having the deeper-inner trench (curve III.3; FIG. 3) has ~1/10th the bend loss (curve III.6 vs. curve II.6; FIG. 6) of the Type I RAF having medium contrast trenches (curve II.3; FIG. 3) for all radii. However, the deeper inner trench, Type I RAF has lower MFD (curve III.5; FIG. 5) and more persistent HOMs (curve III.4; FIG. 4). By more persistent we mean that the confinement loss of the HOMs is lower.

On the other hand, both Type I RAFs have very high bend loss for bend radii significantly below about 5 mm (curves II.6, III.6; FIG. 6) due to the fundamental-mode resonant coupling around the critical radius (resonant peaks 6.2, 6.3 at $r_{crit}$~4 mm). In contrast, the shallow-trench Type II RAF (curve I.3; FIG. 3) has lower bend loss for bend radii as low as 2.5 mm (curve I.6; FIG. 6). In addition, the Type II RAF has a larger critical radius ($r_{crit}$~7.5 mm), but the associated fundamental loss peak 6.1 is much smaller, demonstrating that this detrimental peak can be rendered insignificant in Type II RAF designs in accordance with the present invention.

The critical radius of our Type II RAF is larger than that of the Type I RAF designs because the pedestal/ring is positioned at a larger radius than the rings of the Type I RAFs.

For the Type II RAF bend loss (FIG. 6) is better in some important bending conditions (e.g., for tighter bends less than ~4.5 mm radius) and worse at others (bends greater than ~4.5 mm radius). Resonant coupling essentially gives us the ability to control the shape of this bend loss curve, so that optimal performance is achieved at the most important bend radii for a particular application. Nevertheless, our Type II RAFs have utility over a relatively broad range of bend radii of approximately 2-15 mm (In this context, we consider our simulations and experimental results at a bend radius of 2.5 mm to be applicable to a bend radius of approximately 2 mm.)

Catastrophic Bend Loss:

Our Type II RAF design has distinct advantages over the Type I RAFs. More specifically, the performance of a Type I RAF (curve II.3, FIG. 3) is characterized by catastrophic bend loss; that is, a resonant loss peaks 6.2, 6.3 (curves II.6, III.6; FIG. 6), which occur at a critical bend radius ($r_{crit}$~4 mm in this illustration). In addition, when the bend radius is smaller than about 6.5 mm, for example, the bend loss increases dramatically to peak loss 6.2, 6.3 and, in addition, remains relatively high at radii below $r_{crit}$ down to about 2.5 mm. In contrast, the bend loss of the Type II RAF (curve I.6, FIG. 6) exhibits no comparable resonant loss peak over the same range of radii. (The Type II RAF exhibits only a very shallow, insignificant peak 6.1 around 7.5 mm.) Moreover, the Type II RAF also exhibits much lower bend loss at bend radii between approximately 2.5-4 mm.

Our analysis indicates that the absence of a resonant loss peak in our Type II RAFs is a result of the design feature whereby the index of the outer trench region is relatively close to the index of the outer cladding region. In these shallow-trench designs, the outer trench region provides much less confinement of the pedestal/ring mode than the inner trench region, thereby reducing the resonant coupling between the core region and the pedestal/ring region. This design substantially mitigates the problem of high bend loss at tight bends near the critical radius.

HOM Suppression:

Comparing our Type II RAF (curve I.3, FIG. 3) to the Type I RAF with deep inner trench (curve III.3), we see that they exhibit similar HOM confinement loss performance (curves I.4 vs. III.4; FIG. 4), but the Type II RAF has significantly better (higher) MFD (curve I.5 vs. III.5; FIG. 5). In contrast, the medium trench Type I RAF design (curve II.3, FIG. 3) yields higher MFD (curve II.5; FIG. 5) and less persistent HOMs (curve II.4; FIG. 4), but suffers from the highest and most detrimental resonant loss peak (6.3; FIG. 6) of all three fibers.

Cutoff:

In conventional single mode fibers, it is highly desirable for any HOMs to be effectively cutoff to minimize signal interference. However, for many applications benefiting from highly bend-insensitive fibers, mode-coupling perturbations are relatively weak or relatively far apart, and the applications can be much more tolerant to the presence of light in otherwise unwanted HOMs. For such applications, HOMs can be considered effectively cutoff even with a lower HOM confinement loss than would be required if mode coupling perturbations were stronger or more closely spaced. A lower requirement on HOM confinement loss allows greater flexibility in fiber design. Thus, for example, HOM loss curves III.4 and I.4 may indicate effective cutoff wavelengths around 1300 nm for many applications of interest.

Design:

Since the short wide pedestals/rings of our Type II RAFs have a large effective radius, the critical radius for resonant coupling of the fundamental core mode is larger than for relatively taller narrower pedestals. Since the critical radius is more likely to fall within the range desired for commercial use and installations, it is important that such short, wide pedestals be used in designs that suppress catastrophic loss. In other words, short pedestals should be paired with shallow trenches, as shown by the index profiles of FIG. 3 (curve I.3) and FIG. 1D.

Illustratively, the total thickness ($r_{out}$, FIG. 1D) of the core, trench and pedestal regions is nearly 30 µm (FIG. 3), the total thickness of the trench and pedestal regions exceeds about 20 μm, and the thickness of each of the trench and pedestal regions is about 6-8 μm. Thus, as illustrated in the index profile I.3 (FIG. 3), the inner core diameter is D~9 microns, the core and shelf region have a combined diameter of about 13 μm, and each of the inner trench, pedestal and outer trench regions is about 7.5 μm thick. (See also Table I.)

Type II RAFs—Fabrication Considerations

As noted in the aforesaid parent application, the shallower trench region 14.3c (FIG. 1C) is expected to improve manufacturability of fiber 10c because the outer trench could be created using a glass with relatively low levels of down-doping, such as a down-doped substrate tube [e.g., a F-doped silica (glass) substrate (or starting) tube] rather than a vapor-deposited glass. Use of a substrate tube would reduce the amount of vapor-deposited glass required to fabricate the fiber 10c, thereby reducing manufacturing cost.

In this section, we expand on that theme. In particular, we recognize that the optical performance of an RAF is sensitive to manufacturing variations in the refractive index profile of the fiber. For example, small changes in the index, location or width (thickness) of the trench regions and/or pedestal region can have a large impact on characteristics like bend loss, MFD, cutoff wavelength and dispersion. It is desirable, therefore, to minimize this sensitivity to improve manufacturing yield.

Of particular interest is the impact of the pedestal region characteristics. Pedestal regions with high refractive index (e.g., FIG. 1C; and FIG. 3, curves II.3 and III.3) compared to the outer cladding region are typically narrow in desirable Type I RAF designs. Conversely, in a Type II RAF similar optical performance can be obtained using a pedestal region with an index closer to the outer cladding index but of increased width or thickness (FIG. 1D; FIG. 3, curve I.3). Although optical performance may be similar, designs with tall thin pedestal regions are significantly more sensitive to fractional variations in the parameters of the index profile than are designs with short wide pedestal regions. For example, although a 10% manufacturing variation in pedestal region width (thickness) may not alter bending performance for short wide pedestal regions, such a variation may have significant impact for comparable designs using tall thin pedestal regions.

Just as use of shallow trench regions facilitates the use of glass tubes or glass produced with higher deposition rate, so too can the use of short pedestal regions. In low loss designs, both the pedestal and outer trench regions can be formed using commercially-available glass tubing. For example, the pedestal region can be formed from be a pure (i.e., or unintentionally doped) silica substrate or starting tube inside of which is deposited (e.g., by MCVD) the inner trench and core regions, while the outer trench region can be created by over-cladding this MCVD core rod with a slightly down-doped starting tube, followed by overcladding with another pure silica starting tube. Wide pedestal and outer trench regions are desirable if they are produced from such tubes.

The available types of doped, high-silica tubes compatible with optical fiber preform manufacture are currently limited to low index contrast compared to pure silica, and typically they have a refractive index less than that of pure silica. For example, the typical index of commercially-available, low-cost tubing ranges from around $2 \times 10^{-3}$ below pure silica up to the index of pure silica. Such tubes are doped with fluorine to produce a lower index than pure silica.

Useful high-deposition-rate techniques include external soot processes and glass grain or sand processes. [See, for example, C. Pedrido, WO 2005/102946 (2005).] In these techniques it is desirable to maintain low index contrast compared to pure silica and wide deposition regions to improve both speed and manufacturing cost.

In addition, while some of our Type I RAFs have had high-contrast deposited regions extending beyond 20 μm, some of our Type II RAFs may have deposited regions confined within, for example, a 14 μm radius, thereby reducing the volume of deposited glass by more than a factor of two.

Taking into account these considerations, Method I of making the Type II RAFs of the type described above with reference to FIGS. 3-6 comprises the following process steps:

1) providing a first starting tube (also known as a substrate tube) comprising silica and having an index $n_{ped}$;
2) depositing a multiplicity of down-doped first glass layers on the inside of the first tube; the first glass layers forming the deeper-index inner trench region;
3) depositing a multiplicity of up-doped second glass layers on the first layers; the second layers forming the raised-index core region;
4) collapsing the first tube to form a first rod;
5) providing a second tube comprising down-doped glass and having an index $n_{tro}$;
6) providing a third tube comprising silica and having an index $n_{out}$;
7) placing the first rod inside the second tube;
8) placing the second tube, with the first rod therein, inside the third tube; and
9) collapsing the third tube and second tube onto the first rod to form a fiber preform.

After step (9) techniques well known to those skilled in the optical fiber art may be used to draw a fiber from the preform. In addition, each of the foregoing steps may in practice include multiple sub-steps. Thus, for example, depositing step (3) may include the sub-steps of (3a) depositing a first multiplicity of up-doped layers on the second layers to form the outer core (or shelf) region 12.2d (FIG. 1D) and then (3b) depositing a second multiplicity of up-doped layers on the shelf region 12.2d to form the inner core region 12.1d. Likewise, depositing step (4) may include the sub-steps of (4a) depositing a first multiplicity of down-doped layers on the first layers to form the shallower, outer (or step) portion 14.22d of the deep inner trench region 14.2d (FIG. 3) and then (4b) depositing a second multiplicity of down-doped layers on the step portion 14.22d to form the inner portion 14.21d of the deep inner trench region.

By using multiple tubes [steps (1), (5) and (6)] the volume of silica glass formed by relatively low rate vapor deposition is dramatically reduced, with a concomitant decrease in the fabrication cost. A similar benefit is obtained when substituting the aforementioned external soot or grain processes in place of the second or third tubes in order to overclad the first rod. More specifically, such overcladdings may be formed by deposition of silica-based soot from a flame or by use of glass grain sintered into clear glass. Such methods can be practiced in such a fashion as to create annular regions of different refractive index (e.g. $n_{tro}$ and $n_{out}$) with higher rates of deposition than used for the core or inner cladding regions.

Furthermore, alternative methods for creating the first rod may also be used, such as outside vapor deposition (OVD) or vapor-phase axial deposition (VAD). Since fabrication of the inner regions of a RAF by these methods is typically considerably slower than for outer cladding deposition, it is beneficial to reduce the radial extent of glass deposited using these alternate methods. Indeed, any combination of vapor phase, tube, soot or grain processes may be used to create the inventive index structure so long as the radial extent of material produced from a relatively slow deposition process is reduced.

In Method I, we prefer the fiber design in which the deep inner trench 14.2d (FIG. 1D) includes a deeper inner portion 14.21d and a shallower outer portion (or step) 14.22d. The presence of the step 14.22d has certain fabrication advantages. More specifically, in step (2) of Method I, we have found that the composition of the substrate tube, which is purchased from commercial sources, may adversely affect the quality of the first layers deposited thereon depending on the deposition technique used.

In particular, when using a double-pass technique to form each layer of the deep inner trench 14.2d (deposit soot in the first pass; sinter soot in the second pass) directly on the substrate tube, we have found that high quality silica layers are difficult to obtain. On the other hand, we have overcome this problem by forming the shallower outer trench portion 14.22d using a single-pass deposition technique (e.g., standard MCVD); that is, each layer of outer portion 14.22d is deposited as a F-containing silica layer using $SiF_4$ in a single pass of the torch. However, this technique is capable of producing a maximum negative refractive index only about $-7\times10^{-3}$, which is insufficient for the deeper inner portion 14.21d, which typically requires a more negative index of about $-10\times10^{-3}$. To attain the requisite index of the deeper inner portion, we use a double-pass deposition technique; that is, each layer of inner portion 14.22d is deposited in two passes of the torch: on a first pass, a silica-soot layer is deposited, and then, on a second pass, the soot layer is sintered in the presence of $SiF_4$ to form a F-containing silica layer of the inner portion 14.21d.

More generally, inner trench region deposition techniques depend on the desired refractive index ($n_{tri}$) desired, as follows:

(a) If $0 < n_{tri} \leq -4\times10^{-3}$, then the inner trench region comprises multiple silica layers each formed by single-pass deposition of silica in the presence of $SF_6$;

(b) If $-4\times10^{-3} < n_{tri} \leq -7\times10^{-3}$, then the inner trench region comprises multiple silica layers each formed by single-pass deposition of silica in the presence of $SiF_4$; or (c) If $-7\times10^{-3} < n_{tri} \leq -11\times10^{-3}$, then the inner trench region comprises multiple silica layers each formed by double-pass deposition of silica by first depositing soot and then sintering the soot in the presence of $SiF_4$, as described above; or (d) Combinations of these techniques; in particular, single-pass depositions in the presence of both $SiF_4$ and $SF_6$.

(e) The deep inner trench of (a), (b), (c) or (d) can be produced from alternate methods, such as sintering externally-deposited soot in an atmosphere containing high partial pressure of $SiF_4$, or using small hollow voids to reduce the average refractive index of the glass region.

Although the above-described three-tube method of fabrication is preferred because it reduces the volume of low-deposition-rate glass deposited and hence the cost of manufacturing the fiber, there may be applications in which a somewhat higher cost can be tolerated. In such cases, an alternative approach would be (i) to deposit the pedestal region, the inner trench region and the core region before the collapsing step (4) that forms the first rod and (ii) to use only two starting tubes, one to form the outer trench region of step (5) above and the other to form the outer cladding region of step (6) above.

Accordingly, this alternative two-tube Method II of fabricating our Type II RAF comprises the following steps:

1) providing a first starting tube (also known as a substrate tube) comprising silica and having an index $n_{tro}$;
2) depositing a multiplicity of first glass layers on the inside of the first tube; the first layers forming the pedestal region;
3) depositing a multiplicity of down-doped second glass layers on the first layers; the second glass layers forming the deeper-index inner trench region;
4) depositing a multiplicity of up-doped third glass layers on the second layers; the third layers forming the raised-index core region;
5) collapsing the first tube to form a first rod;
6) providing a second tube comprising silica and having an index $n_{out}$;
7) placing the first rod inside the second tube;
8) collapsing the second tube to form a fiber preform.

As before, after step (8) techniques well known to those skilled in the optical fiber art may be used to draw a fiber from the preform, and, as with the preferred embodiment, each of the above processing steps may include a plurality of substeps.

By using multiple tubes [steps (1) and (6)] the volume of silica glass formed by relatively low rate vapor deposition is reduced compared with Type I RAFs, with a concomitant decrease in the fabrication cost. The reduction, however, is not as great as that achieved with the preferred method. As before, a similar benefit is obtained when substituting external soot or grain processes in place of the second tube, while the core rod may be produced using other well known methods for producing the material of the inner region of the RAF.

When using Method II, where the first layers deposited on the substrate tube do not form a low index trench region, but rather form a higher index pedestal region, it is unnecessary to utilize a single-pass deposition process followed by a double-pass deposition process. Instead, the pedestal region may be formed by single-pass MCVD deposition, and the entire deep inner trench region may be formed by a double-pass technique so that the region exhibits an index of about $-7\times10^{-3}$ or less, as in technique (c) above. Alternatively, the trench region may be formed using one of techniques (a), (b) (d) or (e) above depending on the desired index.

Experimental Results

This example describes Type II RAFs of the type shown by the index profile I.3 of FIG. 3. Various materials, dimensions and operating conditions are provided by way of illustration only and, unless otherwise expressly stated, are not intended to limit the scope of the invention.

We fabricated these Type II RAFs using the above-described 3-tube preferred method and well known MCVD for the silica layer deposition steps. All tubes were obtained from commercial sources. The tubes for the pedestal region and the outer cladding region comprised undoped silica, whereas the tube for the outer trench region comprised F-doped silica and had a refractive index $2\times10^{-3}$ below that of the outer cladding.

The MCVD silica layers were doped with Ge in inner core region 12.1d (FIG. 1D), Ge in annular outer core region 12.2d, and F in inner trench region 14.2d. As noted above, the outer trench region 14.3d was formed by a F-doped tube, and the outer cladding region 14.4d was formed by an undoped tube. The as-drawn fibers had the index contrast profiles shown by curve I.3 of FIG. 3.

We measured bend loss vs. bend diameter of our Type II RAFs at a signal wavelength of 1550 nm and confirmed that the data for each fiber conformed well to curve I.6 (FIG. 6). In particular, these fibers satisfied the following criterion: the bend loss was no more than about 0.1 dB/turn at a bend radius of 5 mm and was no more than about 0.01 dB/turn at a bend radius of 10 mm. In fact, their performance was even better; that is, our fibers exhibited bend loss of about 0.06-0.08 dB/turn at a bend radius of 5 mm and bend loss of about 0.006-0.009 dB/turn at a bend radius of 10 mm.

In addition, we estimated the cutoff from measurements to be around 1262 nm for 22 m lengths of fiber. The mode field diameter at 1310 nm wavelength was measured to be 8.8±0.1 μm.

Another group of fibers fabricated from multiple preforms in accordance with the principles of our invention exhibited bend loss and cable cutoff properties as follows:

Cable cutoff: 1200-1250 nm;

Bend loss: 0.04-0.08 dB/turn at a bend radius of 5 mm and a wavelength of 1550 nm;

Bend loss: 0.005-0.02 dB/turn at a bend radius of 10 mm and a wavelength of 1550 nm. However, we prefer to utilize the more conservative criterion of 0.02 dB/turn at a bend radius of 10 mm to allow for inevitable manufacturing variations that can adversely affect the bend loss performance of fibers. In addition, as noted earlier, at even tighter radii in the 2-4 mm range our fiber exhibits comparably low bend loss; for example, at a bend radius of 3 mm the bend loss is no more than about 0.2 dB/turn, with some fibers having a bend loss of less than 0.1 dB/turn.

It is to be understood that the above-described arrangements are merely illustrative of the many possible specific embodiments that can be devised to represent application of the principles of the invention. Numerous and varied other arrangements can be devised in accordance with these principles by those skilled in the art without departing from the spirit and scope of the invention.

In particular, although we described above how various fiber dimensions affect ring-mode confinement losses, and hence reduce the amount of optical energy coupled back from the pedestal region into the core region, it will be apparent to those skilled in the art that there are other ways to accomplish the same result; e.g., by use of absorption, scattering, fiber bends, mode coupling, or gain. Moreover, these techniques may be used separately or in combination with one another.

In addition, an illustrative, highly generalized application of our access and/or FTTH fibers is shown in FIG. 7. Here, an input fiber (e.g., a standard SMF 70) carries an optical signal from a source 72 (e.g., a transmission system) to a facility 74 (e.g., a building housing a business or home). Illustratively, SMF 70 is spliced to an access fiber 76, a Type II RAF in accordance with our invention. Fiber 76 carries the signal to a utilization device or apparatus 78 located within or associated with the facility. SMF 70 and access fiber 76 are illustratively spliced to one another at a connection box 77, which is typically located on an interior or exterior wall 74.1 of facility 74. However, the connection box could be located elsewhere within the facility or outside it. In either case, access fiber 76 typically does not have a straight line path to utilization apparatus 78. Rather, it often has to navigate around one or more obstacles 79, which means that it frequently has at least one curved segment or section 76.1. As described previously, such curved sections may have a tight bends in which the fiber bend radius is 2-15 mm, approximately. The mode-matching features of our access fibers permit them to be efficiently spliced to SMF and at the same to be bent around obstacles without experiencing excessive bend loss. Alternatively, SMF 70 may be an output fiber or both an input and an output fiber. Therefore, in general SMF 70 may be referred to as an input/output fiber.

Of course, those skilled in the art will readily recognize that the curved segment or section 76.1 could also be located outside the facility 74.

Finally, although we have emphasized the use of our fibers in access applications, it will also be apparent to those skilled in the art that the reduced bend sensitivity of these fibers renders them attractive for use in, for example, sensors or vehicles (e.g., automobiles, airplanes, trains, boats).

We claim:

1. A method of fabricating an optical fiber preform that includes a deep index trench including a shallower outer trench portion formed on a substrate tube and a deeper inner trench portion formed on said shallower outer trench portion, each of said shallower outer trench and deeper inner trench portions comprising multiple silica layers, wherein said method comprises the steps of:
    (1) forming each layer of said shallower outer trench portion in a single-pass deposition of a F-containing silica layer; and
    (2) forming each layer of said deeper inner trench portion in a double-pass deposition in which, in a first pass, a layer of silica soot is deposited and then, in a second pass, the soot is sintered in the presence of $SiP_4$.

2. The method of claim 1, wherein step (1) forms a shallower outer trench portion having a refractive index of approximately $-7\times10^{-3}$ or more, and step (2) forms a deeper inner trench portion having a refractive index of approximately $-7\times10^{-3}$ or less, said refractive indices being measured relative to that of an outer cladding of the fiber.

3. The method of claim 1, further including the step of drawing said fiber from said preform.

* * * * *